(12) United States Patent
Gunness

(10) Patent No.: US 10,519,664 B1
(45) Date of Patent: Dec. 31, 2019

(54) METHOD AND SYSTEM FOR ENSURING LEAK-FREE ROOF INSTALLATION

(71) Applicant: Clark Gunness, Gallatin, TN (US)

(72) Inventor: Clark Gunness, Gallatin, TN (US)

( * ) Notice: Subject to any disclaimer, the term of this patent is extended or adjusted under 35 U.S.C. 154(b) by 0 days.

(21) Appl. No.: 16/263,706

(22) Filed: Jan. 31, 2019

(51) Int. Cl.
*G01M 3/16* (2006.01)
*E04D 13/00* (2006.01)

(52) U.S. Cl.
CPC .............. *E04D 13/006* (2013.01); *G01M 3/16* (2013.01)

(58) Field of Classification Search
CPC ................................. E04D 13/006; G01M 3/16
See application file for complete search history.

(56) References Cited

U.S. PATENT DOCUMENTS

| | | | |
|---|---|---|---|
| 9,624,671 B1* | 4/2017 | Gunness | E04D 13/006 |
| 2012/0313652 A1* | 12/2012 | Jaman | G01N 27/048 324/694 |
| 2014/0361796 A1* | 12/2014 | Vokey | G01N 27/20 324/693 |
| 2015/0288321 A1* | 10/2015 | Schick | H01L 31/02008 136/251 |
| 2017/0097276 A1* | 4/2017 | Gunness | G01M 3/40 |
| 2017/0130459 A1* | 5/2017 | Vokey | E04D 13/006 |
| 2018/0010329 A1* | 1/2018 | Golding, Jr. | E02D 31/025 |
| 2019/0103831 A1* | 4/2019 | Yoon | E04D 15/04 |
| 2019/0178744 A1* | 6/2019 | Vokey | G01M 3/16 |

* cited by examiner

*Primary Examiner* — Dominic E Hawkins
(74) *Attorney, Agent, or Firm* — Michael Persson; Catherine Napjus; Chisholm, Persson & Ball p.a.

(57) ABSTRACT

The present invention is a first system and method for detecting correct installation of a roofing envelope and a second system and method for detecting leaks during the installation of a roofing envelope. The first and second systems and methods may operate independently or in combination.

21 Claims, 3 Drawing Sheets

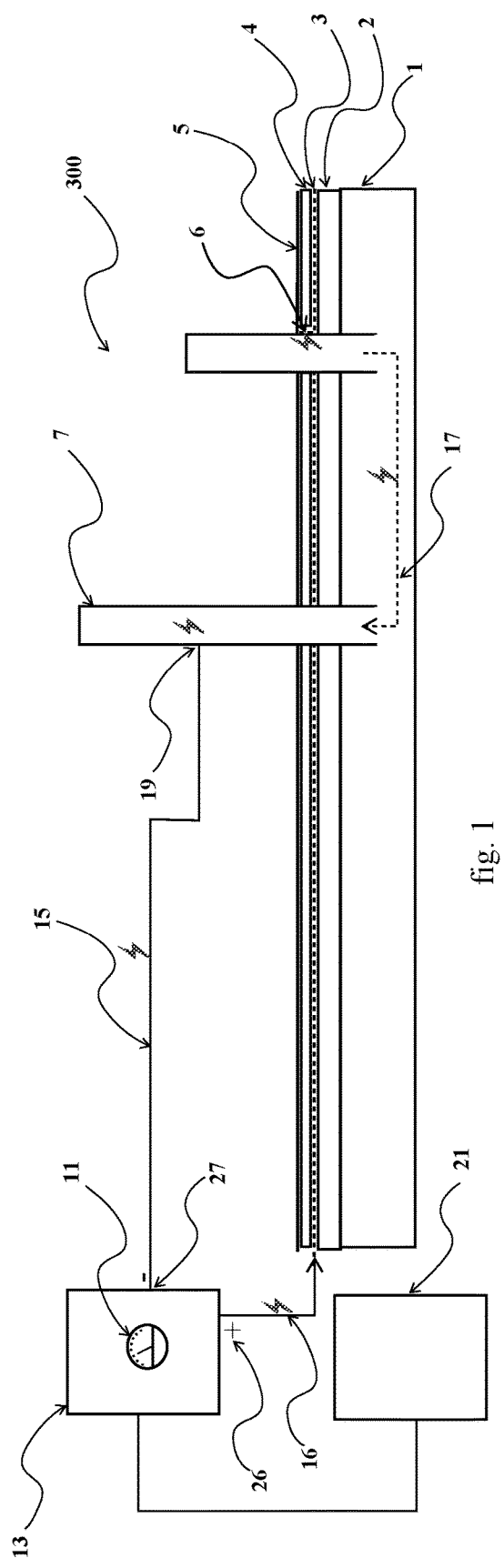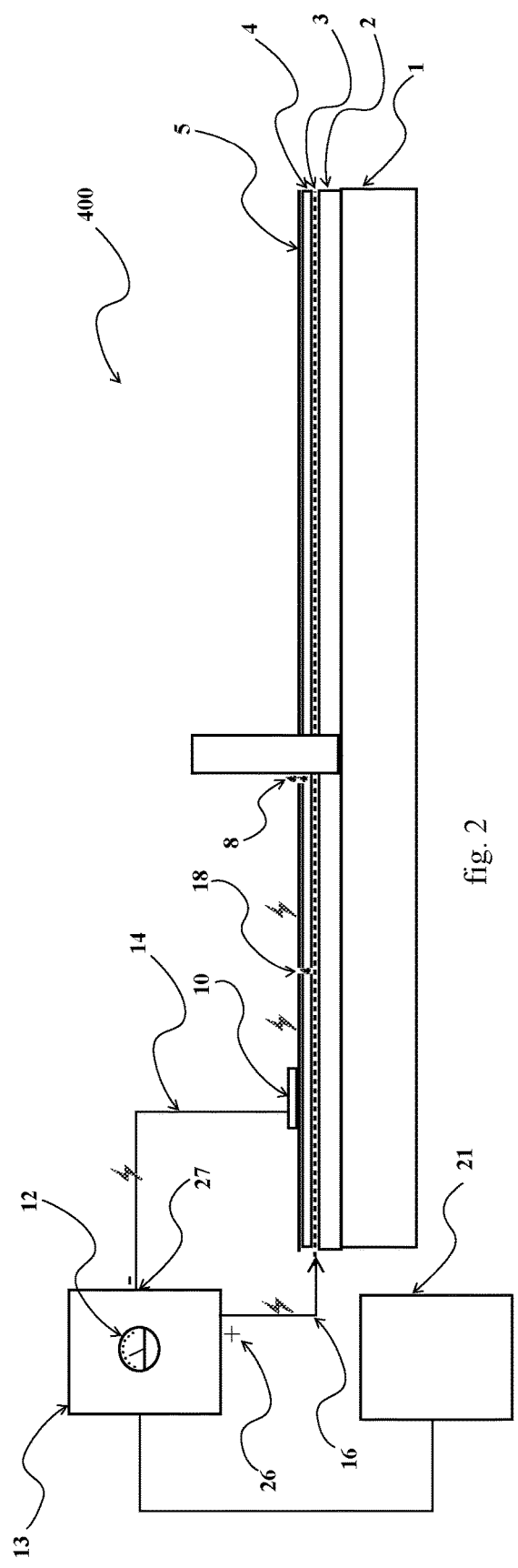

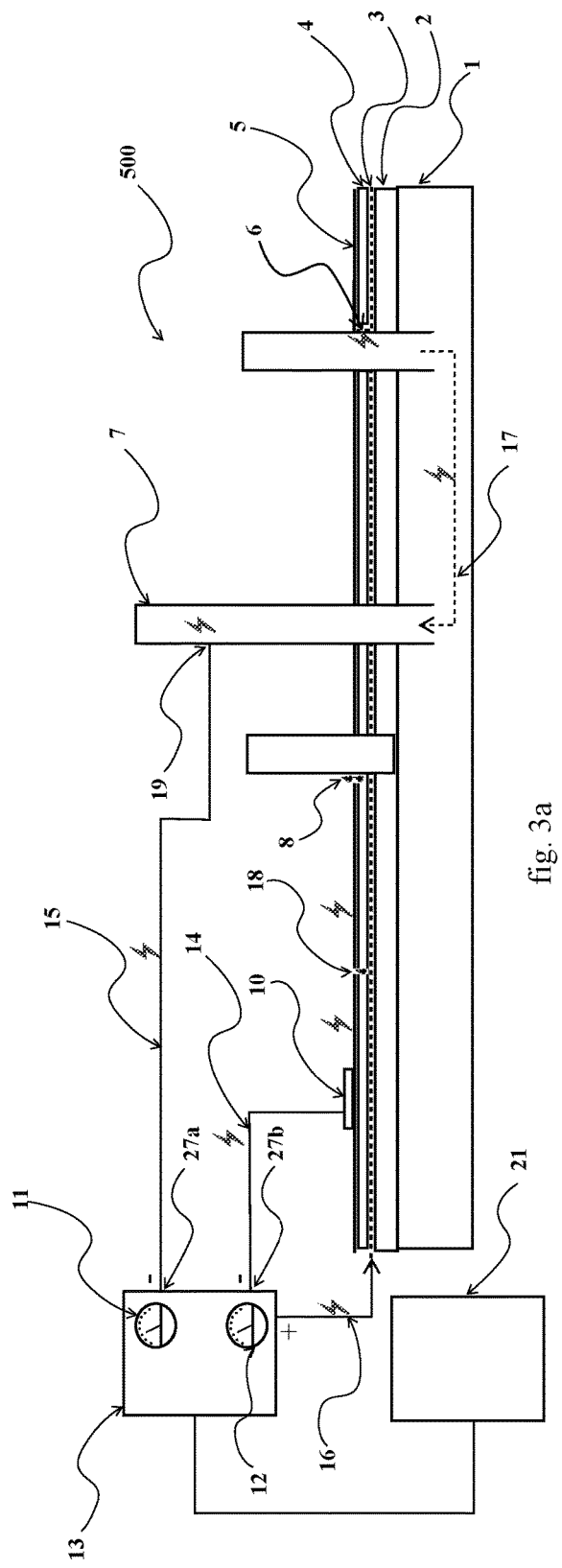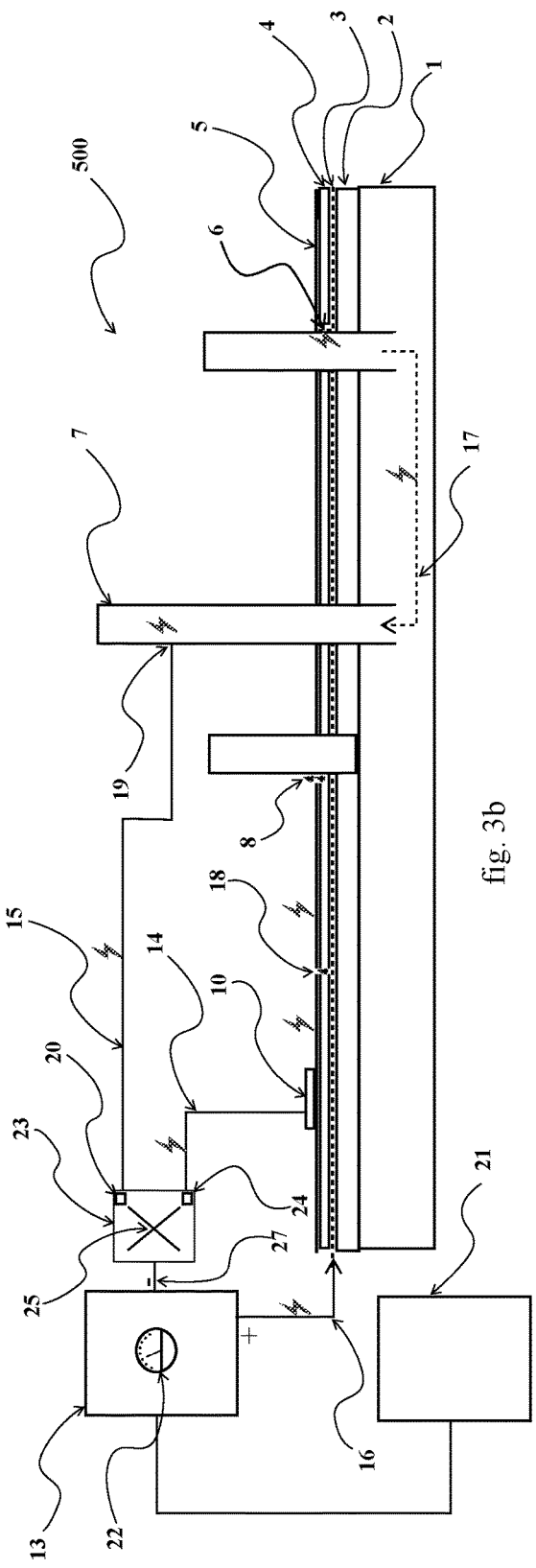

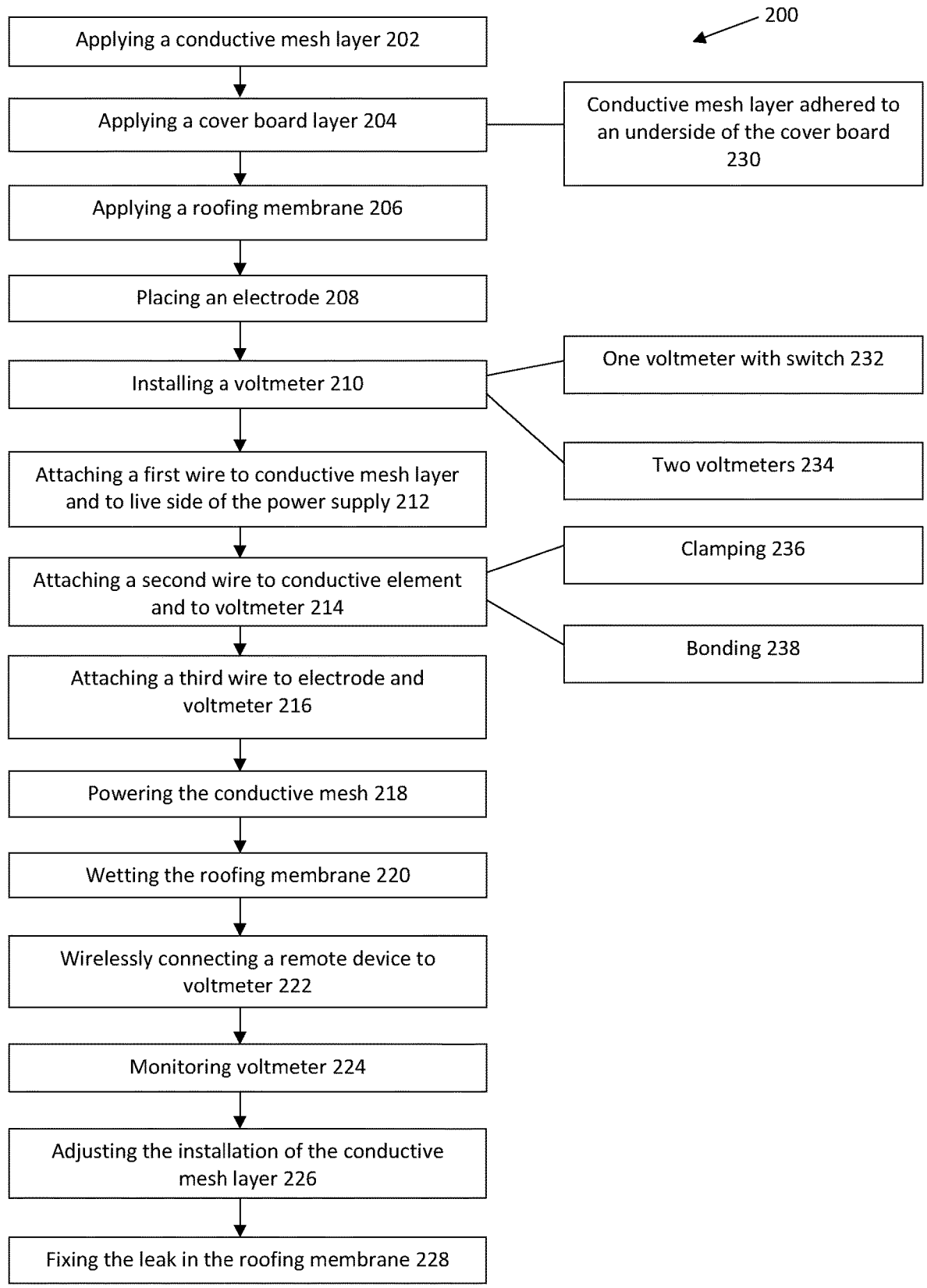

METHOD AND SYSTEM FOR ENSURING LEAK-FREE ROOF INSTALLATION

FIELD OF THE INVENTION

The present invention relates to the detection of water leakage in roofs, and in particular, to the detection of water leakage during the installation of a roofing membranes.

BACKGROUND

Roofing and waterproofing membranes cover billions of square feet of buildings and protect everything from occupants to materials to processes. How these roofing membranes are applied, and the attention paid to applying them properly, has spawned an entire industry. This industry is devoted to monitoring how the membranes are installed with the goal of a properly applied, leak-free roof. Existing electronic, infrared, and nuclear leak detection methods frequently indicate that installation workmanship does not meet high standards. As a result, many membranes leak from the beginning.

Various methods of building leak detection systems into roofs have been developed to detect and locate leaks. Most or all of these methods are engaged after the roof's installation, as these systems are not fully commissionable and are turned on after construction is complete. Even though these systems are essentially not usable until after construction is complete, they, somewhat paradoxically, require constant, onsite monitoring of the application of the membrane and the built-in leak detection components. This monitoring ensures that the leak detection system will work properly once the project is commissioned, but does little to prevent leaks during the installation process. Unfortunately, inspectors are not always available to monitor the installation, and undertrained roofers may easily overlook the importance of proper placement of the leak detection components. A conductive component, such as a mesh or screen under a roofing membrane must be properly positioned, for example, in order for the system to be testable by electronic means in the future.

All too often, the result is a leak detection component of the roofing system that does not properly function or does not function at all. The conductive portions of the system, for example, may be touching a building element in a way that removes the ability of the conductor to either energize a component under the membrane or to recognize an energizing source in the system. This misplacement causes the energy, instead of flowing to the detector, to flow through the structure to the ground. Other common problems caused by simple poor workmanship on roofs include incomplete seams or holes left in the roofing membrane from other, unrelated construction activities. These may cause leakage either during the installation process or, worse, after the process has been completed.

Prior to the current invention, the only way to ensure that these activities do not damage the leak detection system and that the roof is fully functional and tight is to post a person to watch every move of the roofing crew during the entire project. As mentioned earlier, an entire industry of these roof inspectors has sprung up to address quality concerns, but it is still not possible to have a person full-time on every project. Inspectors parcel their time from one project to the next and try to catch problems after they have been created. As a result, some problems become buried in the roofing envelope and are not discovered until the roofing and leak detection system are commissioned.

There is therefore a need for a simple monitoring system that may be used during the roof installation to ensure that the installation results in a leak-free roof.

SUMMARY OF THE INVENTION

The present invention is a system and method for detecting correct installation of a roofing envelope and a system and method for detecting leaks during the installation of a roofing envelope. Hereinafter, the system and method for detecting correct installation shall be referred to as the first system and method. The system and method for detecting leaks during installation shall be referred to as the second system and method. The systems and methods of the present invention make it possible to monitor progress of the roofing envelope installation by ensuring that the conductive mesh layer is properly installed, i.e. not touching the structure or any structural elements and ensuring that any leaks during construction are immediately identified and remedied.

In all of the systems and methods of the present invention, the roofing envelope is installed on a structure that includes an insulation layer on top of the structure. The roofing envelope includes at least the insulation on top of the structure; a conductive mesh layer on top of the insulation; and a roofing membrane installed on top of the conductive mesh layer, where the roofing membrane may include additional insulation, plastic wrapping such as that sold under the trademark TYVEK, and shingles or other outer roofing materials. The roofing envelope may also include a cover board layer disposed between the conductive mesh layer and the roofing membrane, where the conductive mesh may be adhered to the cover board layer. The cover board layer, if included, is described in the inventor's U.S. Pat. No. 10,214,907, which is hereby incorporated by reference. The roofing envelope may also include only an electrically non-conductive vapor barrier, a conductive mesh layer, a coverboard layer, and a roofing membrane.

In the first system and method, the structure includes at least one conductive element integral with the structure. This conductive element may be, for examples, a metal vent pipe, metal columns, or metal beams. In its most basic form, the first system includes the conductive mesh layer; the roofing membrane; a power supply with a live side and a reference side; at least one voltmeter attached to the reference side of the power supply; a first wire attached to the conductive mesh layer and to the live side of the power supply; and a second wire attached to the at least one conductive element and to the at least one voltmeter, so that the voltmeter reads the current flowing through the second wire.

The conductive mesh layer is a layer of mesh, screen, or conductive coating, commonly used in roofing systems, such as those disclosed in the inventor's U.S. Pat. Nos. 9,500,555; 9,624,671; 9,624,672; 9,632,003; and 10,214,907. The power supply is any of a range of commonly known devices that is capable of electrifying something conductive, such as the conductive mesh layer. The power supply is preferably a portable voltage supply. The voltmeter is any of a range of commonly known devices capable of measuring and displaying voltage, such as a DC current reader. The first and second wires are preferably stainless steel wire, but may be copper wire protected within a corrosion resistant sheath, or any conductive wire sufficiently protected from the elements to which it would be exposed during roofing installation such that it remains conductive and unbroken throughout installation. The attachment of the second wire to the conductive element is preferably achieved through clamping or bonding, but may be performed by any means commonly known in the art.

It is preferred that the first system also include a remote device that is wirelessly connected to the voltmeter so that the remote device may indicate the voltmeter readings even from a distance from the installation site. This allows monitoring of the installation from a safer and more comfortable position than the installation site. The wireless connection between the remote device and the voltmeter may be achieved by any means commonly used in the art, such as cellular modem. The remote device may be a mobile phone that receives an alert or phone call indicating the raised voltage; a computer that receives an email indicating the raised voltage; a device dedicated to the system for this purpose; or any other remote device that could indicate the raised voltage to someone offsite in real time.

In practice, as soon as the roofing installation process commences, the conductive mesh layer is powered through the first wire and the power supply. Any current flowing through the second wire will be read by the voltmeter. If the conductive mesh has been properly installed so that it is not touching any part of the structure, including the deck, then the voltmeter will indicate a fairly low baseline or ambient voltage. This ambient voltage is usually less than or equal to 2.4 V. If the conductive mesh has been improperly installed, however, the voltmeter will read a higher voltage and corrective action may be taken before the installation is completed. Another method of determining if the conductive mesh is touching the structure is to turn the voltage to the conductive mesh on and off and observe the increase in voltage when the power is on.

Preferred embodiments of the first system also include the second system, and vice versa. We will present the second system independently and then discuss aspects of the combined system.

In its most basic form, the second system includes the conductive mesh layer; the roofing membrane; an electrode disposed on top of the roofing membrane; a power supply with a live side and a reference side; a voltmeter attached to the reference side of the power supply; a first wire attached to the conductive mesh layer and to the live side of the power supply; and a third wire attached to the electrode and to the voltmeter, so that the voltmeter reads the current flowing through the third wire.

The conductive mesh, power supply, voltmeter, and wires are as described above with respect to the first system. Preferred embodiments of the second system also include a remote device, as described above with respect to the first system. The electrode is any conductive electrode commonly used in the art. Given its use in this system, it is preferably low corrosion, such as stainless steel or conductive plastic, and preferably not copper or mild steel.

In practice, the conductive mesh layer is powered throughout the roofing installation. If the surface of the roofing membrane is wet, and no leaks are present in the roofing membrane or at a flashed penetration, such as a wall, vent, or curb that has risers or has a vertical element from the structural deck, then the voltmeter will indicate a fairly low baseline or ambient voltage. This ambient voltage is usually less than or equal to 2.4 V. Any reading above this ambient voltage will indicate a leak in the roofing membrane or penetration. As mentioned, for the monitoring to be accurate, the roofing membrane must be wet. This may occur naturally through rain or other precipitation or by applying water with a hose or otherwise.

When the two systems are combined, the conductive mesh, roofing membrane, power supply, and first wire are common to each. The second wire remains dedicated to the first system and the third wire remains dedicated to the second system. The voltmeter may or may not be common to each. In some embodiments of the combined system, two voltmeters are attached to the reference side of the power supply, with one dedicated to one system and one dedicated to the other. In other embodiments, one voltmeter is used for both systems, but the voltmeter includes a switch that may be moved between a first position for connection with the second wire and the first system and a second position for connection with the third wire and the second system.

In its most basic form, the first method of the present invention includes the following steps: applying a conductive mesh layer on top of the insulation layer; applying a roofing membrane on top of the conductive mesh layer; installing at least one voltmeter attached to a reference side of a power supply; attaching a first wire to the conductive mesh layer and to a live side of the power supply; attaching a second wire to the at least one conductive element and to the at least one voltmeter, such that the at least one voltmeter reads a current flowing through the second wire; powering the conductive mesh throughout the installation; and monitoring the at least one voltmeter for increases in voltage. As with the first system, in preferred embodiments of the first method, the step of attaching the second wire to the at least one conductive element comprises clamping or bonding the second wire to the at least one conductive element. Preferred embodiments also include the step of wirelessly connecting a remote device to the voltmeter. Preferred embodiments also include the step of reading an increased voltage on the at least one voltmeter and adjusting the installation of the conductive mesh layer until the voltage decreases, i.e. remedying an improper installation.

Preferred embodiments of the first method also include the second method. That is to say, it is preferred that the first method also include the steps of: placing an electrode on top of the roofing membrane; attaching a third wire to the electrode and the at least one voltmeter, such that the at least one voltmeter reads a current flowing through the third wire; and wetting the roofing membrane. In such embodiments, the step of installing at least one voltmeter may comprise installing a single voltmeter with a switch with first and second positions corresponding to the first and second systems, respectively, or installing first and second voltmeters dedicated to the first and second systems, respectively. It is also preferred that such embodiments include the step of reading an increased voltage corresponding to the second system, and fixing the leak that the increased voltage indicates. Such embodiments may also include the step of wirelessly connecting a remote device, as discussed above.

In its most basic form, the second method of the present invention includes the following steps: applying a conductive mesh layer on top of the insulation layer; applying a roofing membrane on top of the conductive mesh layer; installing a voltmeter attached to a reference side of a power supply; attaching a first wire to the conductive mesh layer and to a live side of the power supply; attaching a third wire to the electrode and the voltmeter, such that the voltmeter reads a current flowing through the third wire; powering the conductive mesh throughout the installation; and monitoring the voltmeter for increases in voltage. The second method may include the additional steps regarding wireless connecting a remote device and fixing an indicated leak, as discussed above.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 1 is a schematic of the system for detecting correct installation of a roofing envelope of the present invention.

FIG. 2 is a schematic of the system for detecting a leak during roofing installation of the present invention.

FIG. 3A is a schematic of a preferred combined system for detecting correct installation of a roofing envelope and system for detecting a leak during roofing installation, including a voltmeter dedicated to each system.

FIG. 3B is a schematic of a preferred combined system for detecting correct installation of a roofing envelope and system for detecting a leak during roofing installation, including a single voltmeter with a switch to move between the respective systems.

FIG. 4 is a flow chart of the combined methods of the present invention.

DETAILED DESCRIPTION

Common to FIGS. 1-3B is the basic roofing infrastructure. Both systems 300, 400, and combined system 500 are built on structural roofing deck 1 with insulation layer 2 on top of structural building deck 1; conductive mesh layer 3 on top of insulation layer 2; and roofing membrane 5 on top of conductive mesh layer 3. As shown, preferred embodiments also include cover board layer 4 between conductive mesh layer 3 and roofing membrane 5. Preferred versions of all systems 300, 400, 500 also include remote device 21 wirelessly connected to voltmeter 11 (in FIG. 1); voltmeter 12 (in FIG. 2); first and second voltmeters 11, 12 (in FIG. 3A); or voltmeter 22 (in FIG. 3B). Remote device 21 allows an inspector to read an increased voltage from a safe and comfortable off-site location, or be alerted to such an increased voltage.

Referring first to FIG. 1, a schematic of first system 300 for detecting correct installation of a roofing envelope is provided. First system 300 includes power supply 13 with live side 26, indicated by a "+" sign and reference side 27, indicated by a "−". Voltmeter 11 is attached to reference side 27 of power supply 13. First wire 16 is attached on one end to live side 26 of power supply 13 and on the other end to conductive mesh layer 3. Through this attachment, conductive mesh layer 3 is powered throughout the roof construction and roofing membrane installation. Second wire 15 is attached on one end to voltmeter 11 for access to reference side 27 of power supply 13 and on the other end to a conductive element 7 of the structure. The attachment 19 of second wire 15 to conductive element 7 may be through bonding or clamping. Any current flowing through second wire 15 will be read by voltmeter 11. If conductive mesh layer 3 is touching any structural element 6 of the structure, including deck 1, current 17 will flow through deck 1 to the referenced conductive element 7. Second wire 15 will carry the increased voltage 17 to reference side 27 of power supply 13. As such, any increase from a baseline voltage read from deck 1 will indicate incorrect installation of the roofing envelope in that conductive mesh layer 3 is contacting the structure.

Now referring to FIG. 2, a schematic of second system 400 for detecting a leak during roofing installation is provided. Like first system 300, second system 400 includes the same basic roofing envelope as first system 300, including insulation 2, conductive mesh layer 3, possibly cover board layer 4, and roofing membrane 5. Also, like first system 300, second system 400 includes power supply 13 and first wire 16 attached to live side 26 and conductive mesh layer 3. Unlike first system 300, second system 400 also includes electrode 10 disposed on top of roofing membrane 5 and third wire 14 attached on one end to electrode 10 and on the other end to voltmeter 12 attached to reference side 27 of power supply 13. In second system 400, conductive mesh layer 3 is also powered throughout construction. If the roof develops a leak 18 in roofing membrane 5 or at a flashed penetration 8, current from the conductive mesh layer 3 will flow across the wet surface of roof membrane 5. This current will be picked up by electrode 10 and transmitted via third wire 14 to reference side 27 through voltmeter 12. If voltmeter 12 reads any voltage above ambient, roofing membrane 5 or flashed penetration 8 has a leak.

Referring now to FIGS. 3A and 3B, schematics of two variations of combined system 500 are provided. In addition to the elements of the roofing membrane, first and second systems 300, 400 share power supply 13 and first wire 16. As discussed above with reference to FIGS. 1 and 2, each system 300, 400 requires a voltmeter to operate. As shown in FIG. 3A, each system may have a dedicated voltmeter. In FIG. 3A, first system 300 includes first voltmeter 11 attached to reference side 27a of common power supply 13 and second system 400 includes second voltmeter 12 attached to reference side 27b of common power supply 13. In FIG. 3B, however, a single voltmeter 22 attached to reference side 27 of common power supply 13 serves both first and second systems 300, 400. In such an embodiment, voltmeter 22 includes switch 25 that may be moved between first position 20 to complete first system 300 through second wire 15 and second position 24 to complete second system 400 through third wire 14.

Referring to FIG. 3A (although the concept may also be applied to FIG. 3B), with combined system 500 having leak 18, if flashed penetration 8 is non-conductive, such as a plastic vent pipe, a voltage increase will be read by voltmeter 12 through electrode 10, but voltmeter 11 will not read an increase. If flashed penetration 8 is a structural, conductive penetration, such as conductive element 7, however, then second system 400 will see the increased voltage indicating the leak at penetration 7/8 through electrode 10 and voltmeter 12, but first system 300 will also see the increased voltage through second wire 15 and voltmeter 11. This latter is because the water would have flowed through leak 18 at the flashed penetration 7/8 and wetted both the conductive mesh layer 3 and structural element 7/8, which would cause an electrical connection between conductive mesh layer 3 and structural element 7/8.

Now referring to FIG. 4, a flow chart for method 200, which instructs operation of first and second systems 300, 400, as well as combined system 500 is provided. The operation of first system 300 includes the following steps: applying a conductive mesh layer 202 on top of the insulation layer; applying a roofing membrane 206 on top of the conductive mesh layer; installing at least one voltmeter 210 attached to a reference side of a power supply; attaching a first wire 212 to the conductive mesh layer and to a live side of the power supply; attaching a second wire 214 to the at least one conductive element and to the at least one voltmeter, such that the at least one voltmeter reads a current flowing through the second wire; powering the conductive mesh 218 throughout the installation; and monitoring the at least one voltmeter 224 for increases in voltage. In preferred embodiments of the first method, the step of attaching the second wire 214 to the at least one conductive element comprises clamping 236 or bonding 238 the second wire to the at least one conductive element. Preferred embodiments also include the step of applying a cover board layer 204 on top of the conductive mesh layer. This may entail applying a cover board layer that has the conductive mesh layer adhered to its underside 230. Preferred embodiments also include the step of wirelessly connecting a remote device to the voltmeter 222. Preferred embodiments also include the step of reading an increased voltage on the at least one voltmeter and adjusting the installation 226 of the conductive mesh layer until the voltage decreases, i.e. remedying an improper installation.

The operation of second system 400 includes the following steps: applying a conductive mesh layer 202 on top of the insulation layer; applying a roofing membrane 206 on top of the conductive mesh layer; placing an electrode 208 on top of the roofing membrane; installing a voltmeter 210 attached to a reference side of a power supply; attaching a first wire 212 to the conductive mesh layer and to a live side of the power supply; attaching a third wire 216 to the electrode and the voltmeter, such that the voltmeter reads a current flowing through the third wire; powering the conductive mesh 218 throughout the installation; wetting the roofing membrane 220; and monitoring the voltmeter for increases in voltage 224. Preferred embodiments also include the step of applying a cover board layer 204 on top of the conductive mesh layer. This may entail applying a cover board layer that has the conductive mesh layer adhered to its underside 230. Preferred embodiments also include the step of wirelessly connecting a remote device to the voltmeter 222. Preferred embodiments also include the step of reading an increased voltage, and fixing the leak 228 that the increased voltage indicates. The step of wetting the roofing membrane 220 may be achieved naturally by rain or other precipitation or by manually wetting the roofing membrane, such as with a hose.

The operation of preferred combined system 500 includes the steps of: applying a conductive mesh layer 202 on top of the insulation layer; applying a cover board layer 204 on top of the conductive mesh layer; applying a roofing membrane 206 on top of the cover board layer; placing an electrode 208 on top of the roofing membrane; installing at least one voltmeter 210 attached to a reference side of a power supply; attaching a first wire 212 to the conductive mesh layer and to a live side of the power supply; attaching a second wire 214 to the at least one conductive element and to the at least one voltmeter, such that the at least one voltmeter reads a current flowing through the second wire; attaching a third wire 216 to the electrode and the voltmeter, such that the voltmeter reads a current flowing through the third wire; powering the conductive mesh 218 throughout the installation; wetting the roofing membrane 220; wirelessly connecting a remote device to the voltmeter 222; monitoring the at least one voltmeter 224 for increases in voltage; reading an increased voltage on the at least one voltmeter and adjusting the installation 226 of the conductive mesh layer until the voltage decreases; and reading an increased voltage, and fixing the leak 228 that the increased voltage indicates. In combined method 200, the step of installing a voltmeter 210 may include the step of installing first and second voltmeters 234, where the first voltmeter is dedicated to the first system and the second voltmeter is dedicated to the second system. Alternatively, the step of installing a voltmeter 210 may include the step of installing a single voltmeter 232, where the single voltmeter includes a switch, as described above with respect to FIG. 3B.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A system for detecting correct installation of a roofing envelope for application to a structure that includes an insulation layer on top of the structure and at least one conductive element integral with the structure, said system comprising:
    a conductive mesh layer disposed on top of the insulation;
    a roofing membrane disposed on top of said conductive mesh layer;
    a power supply comprising a live side and reference side;
    at least one voltmeter attached to said reference side of said power supply;
    a first wire attached to said conductive mesh layer and said live side of said power supply; and
    a second wire attached to the at least one conductive element and said at least one voltmeter, such that said at least one voltmeter reads a current flowing through said second wire.

2. The system as claimed in claim 1, further comprising a cover board layer disposed between said conductive mesh layer and said roofing membrane.

3. The system as claimed in claim 1, further comprising a remote device, wherein said remote device is wirelessly connected to said at least one voltmeter such that said remote device indicates the current read by said at least one voltmeter.

4. The system as claimed in claim 1, further comprising:
    an electrode disposed on top of said roofing membrane; and
    a third wire attached to said electrode and said at least one voltmeter, such that said at least one voltmeter reads a current flowing through said third wire.

5. The system as claimed in claim 4, wherein said at least one voltmeter is one voltmeter and said voltmeter comprises a switch comprising a first position and a second position such that:
    when said voltmeter is in said first position, said voltmeter reads the current flowing through said second wire; and
    when said voltmeter is in said second position, said voltmeter reads the current flowing through said third wire.

6. The system as claimed in claim 4, wherein said at least one voltmeter is a first and second voltmeter, wherein said first voltmeter reads the current flowing through said second wire and said second voltmeter reads the current flowing through said third wire.

7. The system as claimed in claim 4, further comprising a remote device, wherein said remote device is wirelessly connected to said at least one voltmeter such that said remote device indicates the current read by said at least one voltmeter.

8. A method for detecting correct installation of a roofing envelope installed on a structure that includes an insulation layer on top of the structure and at least one conductive element integral with the structure, said method comprising the steps of:
    applying a conductive mesh layer on top of the insulation layer;
    applying a roofing membrane on top of the conductive mesh layer;

installing at least one voltmeter attached to a reference side of a power supply;
attaching a first wire to the conductive mesh layer and to a live side of the power supply;
attaching a second wire to the at least one conductive element and to the at least one voltmeter, such that the at least one voltmeter reads a current flowing through the second wire;
powering the conductive mesh throughout the installation; and
monitoring the at least one voltmeter for increases in voltage.

9. The method as claimed in claim 8, further comprising the step of applying a cover board between the conductive mesh layer and the roofing membrane.

10. The method as claimed in claim 8, further comprising the step of wirelessly connecting a remote device to the voltmeter such that the remote device indicates the current read by the at least one voltmeter, wherein said step of monitoring the at least one voltmeter for increases in voltage comprises monitoring the remote device.

11. The method as claimed in claim 8, further comprising the steps of reading an increased voltage on the at least one voltmeter and adjusting the installation of the conductive mesh layer until the voltage decreases.

12. The method as claimed in claim 8, further comprising the steps of:
placing an electrode on top of the roofing membrane;
attaching a third wire to the electrode and the at least one voltmeter, such that the at least one voltmeter reads a current flowing through the third wire; and
wetting the roofing membrane.

13. The method as claimed in claim 12, wherein said step of installing at least one voltmeter comprises installing one voltmeter that comprises a switch comprising a first position and a second position, such that:
when the voltmeter is in the first position, the voltmeter reads the current flowing through the second wire; and
when the voltmeter is in the second position, the voltmeter reads the current flowing through the third wire.

14. The method as claimed in claim 13, further comprising the steps of reading an increased voltage on the voltmeter in the first position and adjusting the installation of the conductive mesh layer until the voltage decreases.

15. The method as claimed in claim 13, further comprising the steps of reading an increased voltage on the voltmeter in the second position and fixing the leak in the roofing membrane, as indicated by a voltage decrease.

16. The method as claimed in claim 12, wherein the at least one voltmeter is a first and second voltmeter, wherein the first voltmeter reads current flowing through the second wire and the second voltmeter reads current flowing through the third wire.

17. The method as claimed in claim 16, further comprising the steps of reading an increased voltage on the second voltmeter and fixing the leak in the roofing membrane, as indicated by a voltage decrease.

18. The method as claimed in claim 12, further comprising the step of wirelessly connecting a remote device to the at least one voltmeter such that the remote device indicates the current read by the at least one voltmeter, wherein said step of monitoring the voltmeter for increases in voltage comprises monitoring the remote device.

19. A method for detecting leaks during installation of a roofing envelope installed on a structure that includes an insulation layer on top of the structure and at least one conductive element integral with the structure, said method comprising the steps of:
applying a conductive mesh layer on top of the insulation layer;
applying a roofing membrane on top of the conductive mesh layer;
installing a voltmeter attached to a reference side of a power supply;
attaching a first wire to the conductive mesh layer and to a live side of the power supply;
attaching a third wire to the electrode and the voltmeter, such that the voltmeter reads a current flowing through the third wire;
powering the conductive mesh throughout the installation;
monitoring the voltmeter for increases in voltage;
reading an increased voltage on the voltmeter; and
fixing the leak in the roofing membrane, as indicated by a voltage decrease.

20. The method as claimed in claim 19, further comprising the step of wirelessly connecting a remote device to the voltmeter such that the remote device indicates the current read by the voltmeter, wherein said step of monitoring the voltmeter for increases in voltage comprises monitoring the remote device.

21. The method as claimed in claim 19, further comprising the step of applying a cover board between the conductive mesh layer and the roofing membrane.

* * * * *